(12) United States Patent
Sakuma et al.

(10) Patent No.: US 10,031,282 B2
(45) Date of Patent: Jul. 24, 2018

(54) OPTICAL FIBER

(71) Applicant: SUMITOMO ELECTRIC INDUSTRIES, LTD., Osaka-shi, Osaka (JP)

(72) Inventors: Hirotaka Sakuma, Yokohama (JP); Yoshiaki Tamura, Yokohama (JP); Keisei Morita, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/700,493

(22) Filed: Sep. 11, 2017

(65) Prior Publication Data

US 2017/0371096 A1   Dec. 28, 2017

Related U.S. Application Data

(63) Continuation of application No. PCT/JP2017/005077, filed on Feb. 13, 2017.

(30) Foreign Application Priority Data

Feb. 26, 2016   (JP) .................. 2016-035202

(51) Int. Cl.
   *G02B 6/02*     (2006.01)
   *C03B 37/012*   (2006.01)
   *C03C 13/04*    (2006.01)
   *C03B 37/014*   (2006.01)

(52) U.S. Cl.
   CPC .......... *G02B 6/02* (2013.01); *C03B 37/01453* (2013.01); *C03C 13/042* (2013.01); *C03B 2201/50* (2013.01); *C03B 2203/22* (2013.01)

(58) Field of Classification Search
   None
   See application file for complete search history.

(56) References Cited

U.S. PATENT DOCUMENTS

| 7,088,900 | B1 | 8/2006 | Mishra |
| 9,575,245 | B2* | 2/2017 | Tamura .................... G02B 6/02 |
| 2005/0129376 | A1 | 6/2005 | Hanson et al. |
| 2016/0318793 | A1* | 11/2016 | Tamura ................. C03C 13/046 |

FOREIGN PATENT DOCUMENTS

| JP | 2016-105154 A | 6/2016 |
| JP | 2016-210632 A | 12/2016 |

OTHER PUBLICATIONS

P. L. Chu et al., "Measurement of stresses in optical fiber and preform," Applied Optics, 1982, pp. 4241-4245, vol. 21, No. 23.

* cited by examiner

*Primary Examiner* — Michelle R Connelly
(74) *Attorney, Agent, or Firm* — Drinker Biddle & Reath LLP (57) ABSTRACT

An optical fiber containing alkali metal elements or the like in which Rayleigh scattering loss can be reduced is provided. An optical fiber includes a core composed of silica glass and a cladding which surrounds the core, has a refractive index lower than a refractive index of the core, and is composed of silica glass containing fluorine. The core contains a first group of dopants and a second group of dopants having a diffusion coefficient lower than a diffusion coefficient of the first group of dopants. The difference between the maximum value and the minimum value of residual stress in the optical fiber is 150 MPa or less.

4 Claims, 7 Drawing Sheets

| ATOM | Na | K | Cs | Ca |
|---|---|---|---|---|
| DIFFUSION COEFFICIENT cm$^2$/s | $6 \times 10^{-5}$ | $4 \times 10^{-6}$ | $2 \times 10^{-6}$ | $6 \times 10^{-7}$ |

FIG. 7

OPTICAL FIBER

CROSS-REFERENCE TO RELATED APPLICATIONS

This application is a continuation application of PCT/JP2017/005077 claiming the benefit of priority of the Japanese Patent Application No. 2016-035202 filed on Feb. 26, 2016, the entire contents of which are incorporated herein by reference.

TECHNICAL FIELD

The present invention relates to an optical fiber.

BACKGROUND ART

As an optical fiber having low Rayleigh scattering loss and low transmission loss, a silica glass-based optical fiber whose core contains an alkali metal element or alkaline earth metal element is known (for example, refer to US 2005/0129376 A1 and U.S. Pat. No. 7,088,900 B1). Such an optical fiber is manufactured by drawing an optical fiber preform whose core portion contains an alkali metal element or alkaline earth metal element. In the case where the core portion of the optical fiber preform contains an alkali metal element or alkaline earth metal element, the viscosity of the core portion can be decreased during drawing of the optical fiber preform, and the network structure of silica glass can be made homogeneous. Therefore, the Rayleigh scattering loss resulting from inhomogeneity of the structure can be reduced. In this description, unless otherwise indicated, an alkali metal element or alkaline earth metal element will be generically referred to as an "alkali metal element or the like".

A diffusion method is a known technique for adding an alkali metal element or the like into silica glass. In the diffusion method, while introducing raw material vapor of an alkali metal element or the like or a salt of an alkali metal or the like, which serves as a raw material, into a silica glass-based glass pipe, by heating the glass pipe with an external heat source or generating plasma inside the glass pipe, the alkali metal element or the like is diffused and added to the inner surface of the glass pipe.

After the alkali metal element or the like has been added to the inner surface and its vicinity of the glass pipe, the diameter of the glass pipe is reduced by heating. After the diameter reduction, for the purpose of removing transition metal elements, such as Ni and Fe, which are impurities simultaneously added during the addition of the alkali metal element or the like, the inner surface of the glass pipe is etched to a certain thickness. Since the alkali metal element or the like diffuses faster than the transition metal elements, the alkali metal element or the like is allowed to remain even when the transition metal elements are removed by etching the glass surface to a certain thickness. After the etching, the glass pipe is consolidated by heating, and thereby, a core rod containing the alkali metal element or the like in the central part thereof is produced. Glass that serves as an outer peripheral portion of the core may be added to the outer side of the core rod containing the alkali metal element or the like, and the whole body may be considered as a core portion of an optical fiber preform. A cladding portion having a lower refractive index than the core portion including the core rod containing the alkali metal element or the like is synthesized on the outer side of the core portion, and thereby, an optical fiber preform is produced. An optical fiber can be manufactured by melting the optical fiber preform in a high-temperature furnace, followed by drawing by a known method.

SUMMARY OF INVENTION

Technical Problem

It is an object of the present invention to provide an optical fiber containing alkali metal elements or the like in which Rayleigh scattering loss can be reduced.

Solution to Problem

An optical fiber according to the present invention includes a core composed of silica glass which contains a first group of dopants consisting of alkali metal elements or alkaline earth metal elements and having a diffusion coefficient of $1 \times 10^{-12}$ cm$^2$/s or more in silica glass at a temperature of 2,000° C. to 2,300° C. and a second group of dopants consisting of alkali metal elements or alkaline earth metal elements and having a diffusion coefficient that is lower than the diffusion coefficient of the first group of dopants in silica glass; and a cladding which surrounds the core, has a refractive index lower than a refractive index of the core, and is composed of silica glass containing fluorine. The difference between the maximum value and the minimum value of residual stress in the optical fiber is 150 MPa or less. The residual stress can be measured on the basis of change in the phase of light that has passed through an optical fiber, which is described, for example, in P. L. Chu and T. Whitbread, "Measurement of stresses in optical fiber and preform", Appl. Opt. 21, 4241 (1982). This document is incorporated herein by reference.

In the optical fiber according to the present invention, the ratio C2/C1 is preferably 5 or more, and the ratio C2/C1 is preferably 30 or less, where C1 is the average concentration of the first group of dopants in the core, and the C2 is the average concentration of the second group of dopants in the core.

In the optical fiber according to the present invention, preferably, the average concentration C1 is 1 to 20 wtppm, and the average concentration C2 is 20 to 300 wtppm. The expression "1 wtppm" indicates that 0.001 g of atoms is contained in 1,000 g of SiO$_2$. Furthermore, preferably, the core contains Na or K as the first group of dopants and contains any one of Rb, Cs, Mg, Ca, and Sr as the second group of dopants.

Advantageous Effects of Invention

In the optical fiber according to the present invention, Rayleigh scattering loss can be reduced.

DESCRIPTION OF EMBODIMENTS

Embodiments for carrying out the present invention will be described in details with reference to the attached drawings. In the drawings, the same components are designated by the same reference numerals, and duplicate descriptions are omitted. The present invention is not limited to the examples but is defined by the appended claims, and is intended to include all modifications within the meaning and scope equivalent to those of the claims.

Regarding manufacturing of an optical fiber which contains alkali metal elements or the like and has low transmission loss, the present inventors made the following findings. In the case where elements that have a relatively high diffusion rate, such as Na and K, are added as alkali metal elements or the like to the center and its vicinity of the core portion of an optical fiber preform, the alkali metal elements or the like diffuse to the outside of the core portion in the drawing step. Consequently, the viscosity of the glass of the core portion cannot be decreased sufficiently, and the Rayleigh scattering loss cannot be reduced sufficiently. On the other hand, in the case where elements that have a relatively low diffusion rate, such as Cs and Ca, are added as alkali metal elements or the like to the center and its vicinity of the core portion of an optical fiber preform, the alkali metal elements or the like remain in the center and its vicinity of the core portion and do not diffuse to the outside of the core portion in the drawing step.

As a result, the viscosity of the outer periphery of the core and the cladding portion is not decreased, causing a large strain inside the glass due to drawing tension during drawing and thermal shrinkage in the cooling process. Consequently, the Rayleigh scattering loss cannot be reduced sufficiently.

As the means for solving the problems described above, consideration may be given to optimizing the conditions, such as the temperature in the drawing step and the residence time in the furnace. However, the conditions, such as the temperature in the drawing step and the residence time in the furnace, depend on the size of the optical fiber preform and the drawing speed. Therefore, controlling diffusion state of the element by using these conditions restricts the size of the optical fiber preform and the drawing speed, thereby restricting manufacturing costs and productivity, which is not desirable.

Figure 1:
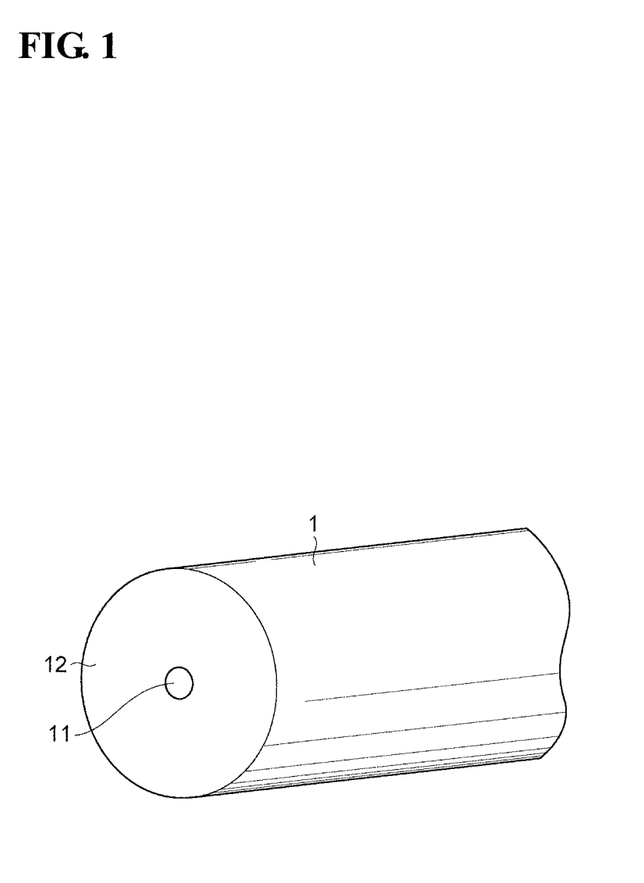
FIG. 1 is a perspective view showing an optical fiber according to an embodiment of the present invention.

FIG. 1 is a perspective view showing an optical fiber 1 according to an embodiment of the present invention. The optical fiber 1 includes a core 11 and a cladding 12, each composed of silica glass. The cladding 12 surrounds the core 11, has a refractive index lower than a refractive index of the core 11, and is composed of pure silica glass or silica glass containing chlorine or fluorine. The physical properties of the optical fiber 1 are uniform in the longitudinal direction thereof. The core 11 contains K as a first dopant having a diffusion coefficient of $4 \times 10^{-6}$ cm$^2$/s or more in silica glass at a temperature of 2,000° C. to 2,300° C. and Cs as a second dopant having a diffusion coefficient of $4 \times 10^{-6}$ cm$^2$/s or less. Note that the first dopant is not limited to K and may be Na, and the second dopant is not limited to Cs and may be Rb, Mg, Ca, or Sr.

Figure 2:
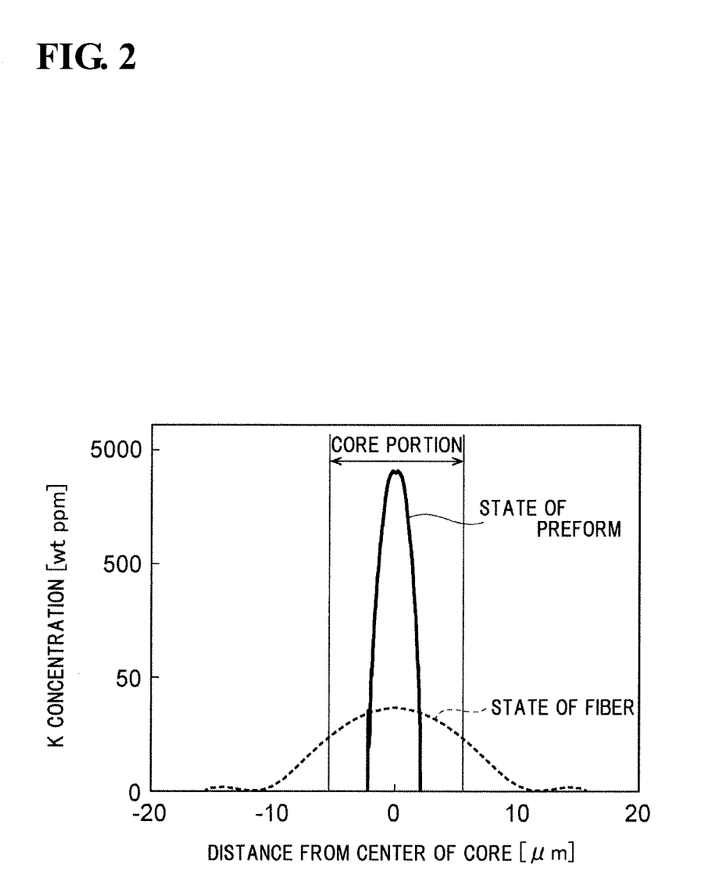
FIG. 2 is a graph schematically showing the K concentration distribution in the radial direction in each of an optical fiber preform and an optical fiber.
Figure 3:
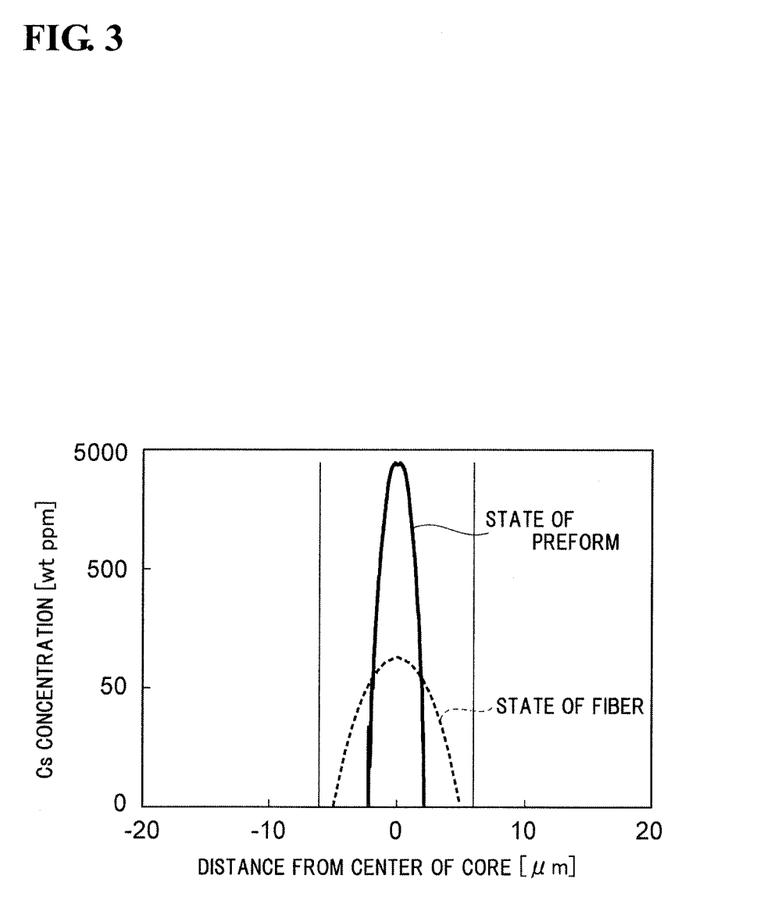
FIG. 3 is a graph schematically showing the Cs concentration distribution in the radial direction in each of an optical fiber preform and an optical fiber.

FIG. 2 is a graph schematically showing the K concentration distribution in the radial direction in each of an optical fiber preform and an optical fiber. FIG. 3 is a graph schematically showing the Cs concentration distribution in the radial direction in each of an optical fiber preform and an optical fiber. In these graphs, the horizontal axis indicates the distance from the center of the core in the fiber. The concentration distribution in the state of the preform, which is originally a function of the distance from the center of the core portion in the preform, is shown by converting it to the distance from the center of the core in the fiber when the preform is drawn to the optical fiber.

In the case where the first group of dopants (Na or K) is added to the center of the core portion of the optical fiber preform, since the first group of dopants has a high diffusion coefficient, as shown in FIG. 2, the first group of dopants diffuses and spreads to the entire core of the optical fiber (and further to the cladding) when heated to the temperature of 2,000° C. to 2,300° C. during drawing. The core average concentration of the first group of dopants in the core of the optical fiber decreases to about ⅒ of that in the state of the optical fiber preform, and it is not possible to sufficiently reduce the Rayleigh scattering loss of the core. However, since the first group of dopants diffuses to the cladding, the viscosity of the cladding decreases, the strain generated due to the difference in viscosity between the core and the cladding during drawing decreases, and an effect of reducing the Rayleigh scattering loss in the outer periphery of the core and the cladding can be expected. When the Rayleigh scattering loss is reduced in a fiber that contains the first group of dopants and does not contain the second group of dopants, including the cladding, for example, in the case where K is included, the transmission loss at a wavelength of 1,550 nm is 0.154 dB/km or less. In this case, the region in which the first dopant diffuses to cause compressive stress is a region with a radius of 15 μm or more. Furthermore, the difference between the maximum and the minimum of residual stress in the fiber is 50 to 150 MPa.

In the case where the core portion of the optical fiber preform does not contain the first group of dopants, and the second group of dopants is added to the center of the core portion of the optical fiber preform, since the diffusion coefficient of the second group of dopants is about ½ of the diffusion coefficient of the first group of dopants, as shown in FIG. 3, most of the second group of dopants remain also in the core in the optical fiber. In the case where the core portion contains the second group of dopants at the same concentration as that of the first group of dopants, the Rayleigh scattering loss of the core of the optical fiber can be further reduced. On the other hand, since the second group of dopants does not diffuse to the cladding, the viscosity of the cladding does not decrease. A difference in viscosity occurs at the interface between the core and the cladding, causing strain, and Rayleigh scattering in this portion increases.

Therefore, in the case where the first group of dopants is not included and the second group of dopants is included, the loss of the optical fiber is 0.156 dB/km as a whole. In this case, the region in which the second dopant diffuses to cause compressive stress is a region with a radius of 10 μm or less. Furthermore, the difference between the maximum and the minimum of residual stress in the fiber is 150 Mpa or more. Compared with the case where the fiber contains the first dopant only as described above, when the difference between the maximum and the minimum of residual stress in the fiber is 150 Mpa or less, the transmission loss at a wavelength of 1,550 nm is 0.154 dB/km or less.

The optical fiber according to this embodiment contains the first group of dopants having a high diffusion coefficient and also contains the second group of dopants having a low diffusion coefficient at a certain ratio or more, and therefore, the Rayleigh scattering loss can be reduced sufficiently. That is, by setting the ratio C2/C1 within a specific range, where C1 is the average concentration of the first group of dopants in the core, and C2 is the average concentration of the second group of dopants in the core, to decrease the difference in viscosity between the core and the cladding, and by setting the difference between the maximum value and the minimum value of residual stress in the optical fiber to be 150 MPa or less, the Rayleigh scattering loss can be reduced sufficiently.

Since the cladding contains F as a dopant for decreasing the refractive index, the effect of decreasing viscosity due to F is also exhibited. Accordingly, even though the first group of dopants diffuses during drawing, when the core average concentration in the fiber is 0.2 wtppm or more, the viscosity of the cladding is decreased sufficiently, resulting in reduction in Rayleigh scattering loss.

On the other hand, in order to increase the concentration of the first group of dopants in the cladding to more than 10 wtppm, it is necessary to increase the peak concentration in the preform state to 10,000 wtppm or more. However, when the peak concentration is high as described above, an increase in loss assumably due to glass defects newly occurs, and therefore, it is not possible to reduce the loss.

In order to decrease the viscosity of a core to the same degree as in a cladding which contains 0.2 wtppm of K, the ratio C2/C1 is preferably 5 or more, where C2 is the average concentration of the second group of dopants in the core, and C1 is the average concentration of K. In this case, tensile strain on the core is relieved, and the loss is reduced. On the other hand, when the ratio C2/C1 is more than 30, not only the difference between the maximum value and the minimum value of residual stress in the optical fiber increases, but also crystals are likely to form, which will cause a loss increase. Therefore, the ratio C2/C1 is preferably 30 or less.

Figure 4:
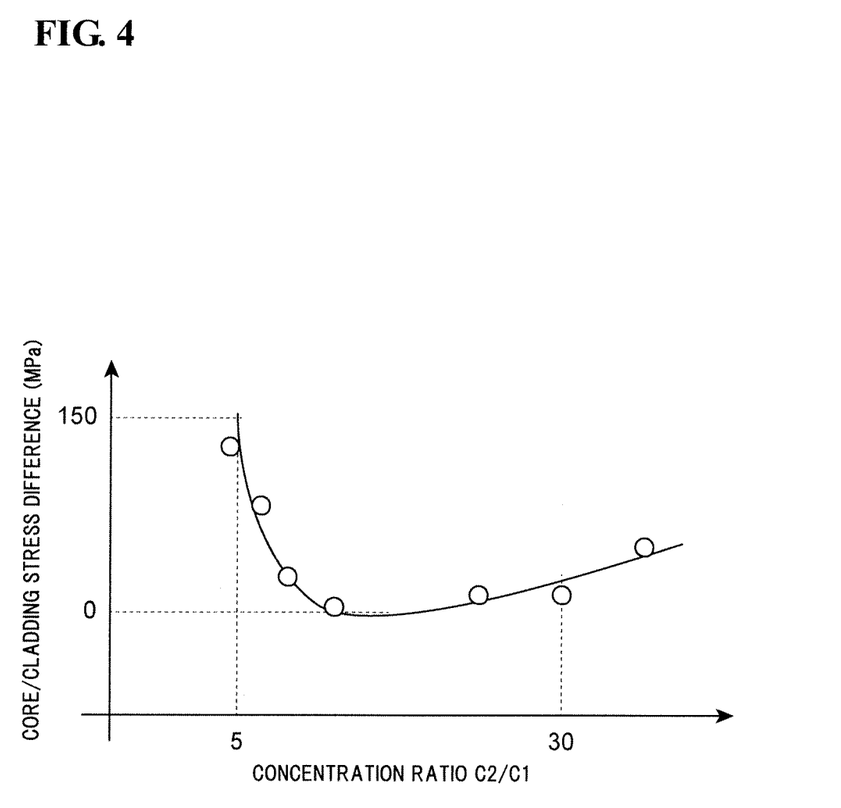
FIG. 4 is a graph showing the relationship between the ratio C2/C1 and the difference between the maximum value and the minimum value of residual stress.
Figure 5:
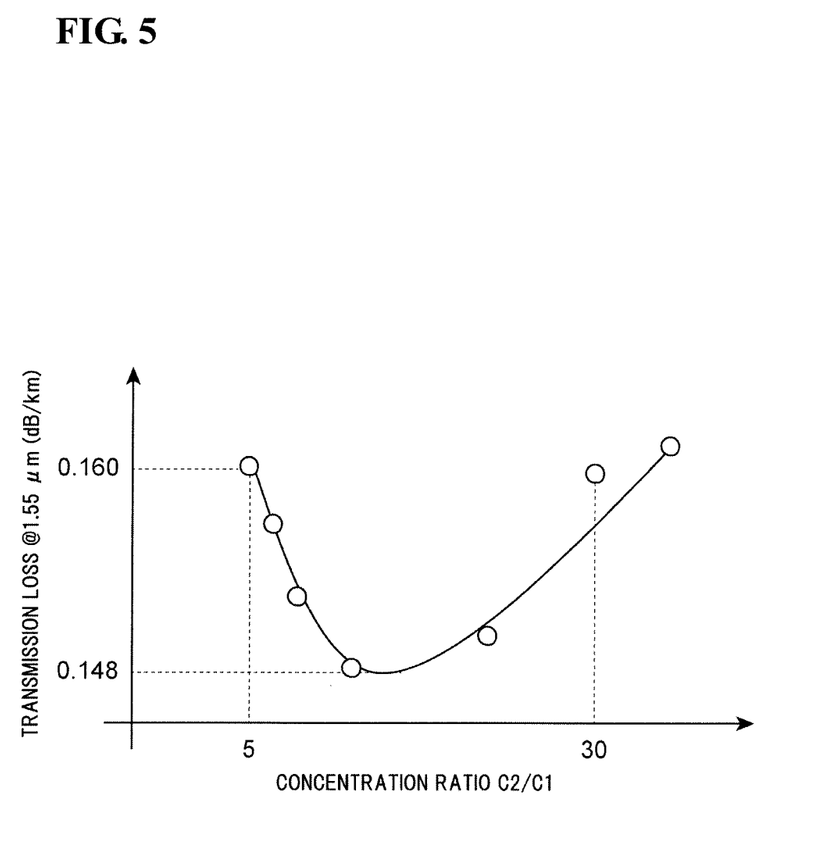
FIG. 5 is a graph showing the relationship between the ratio C2/C1 and the transmission loss.

FIG. 4 is a graph showing the relationship between the ratio C2/C1 and the difference between the maximum value and the minimum value of residual stress in the optical fiber. FIG. 5 is a graph showing the relationship between the ratio C2/C1 and the transmission loss. As shown in the graphs, in order for the difference between the maximum value and the minimum value of residual stress between the core and the cladding of the optical fiber to be 150 MPa or less, the ratio C2/C1 is required to be 5 or more. In addition, in order for the transmission loss at a wavelength of 1,550 nm to be 0.154 dB/km or less, the ratio C2/C1 is required to be 30 or less.

Regarding Rb, Cs, Mg, Ca, and Sr that can be suitably used as the second group of dopants, the diffusion coefficient at the drawing temperature (2,000° C. to 2,300° C.) is ½ to 1/10 relative to the diffusion coefficient of K, and the spreading due to diffusion in the drawing step is small compared to the core diameter with a radius of about 6 μm. Therefore, they decrease the viscosity of the core and are advantageous in reducing the Rayleigh scattering loss.

The average concentration C1 of the first group of dopants in the core is preferably 1 to 20 wtppm, and the average concentration C2 of the second group of dopants in the core is preferably 20 to 300 wtppm. Such dopant concentrations are suitable in manufacturing a low-loss optical fiber.

Figure 6:
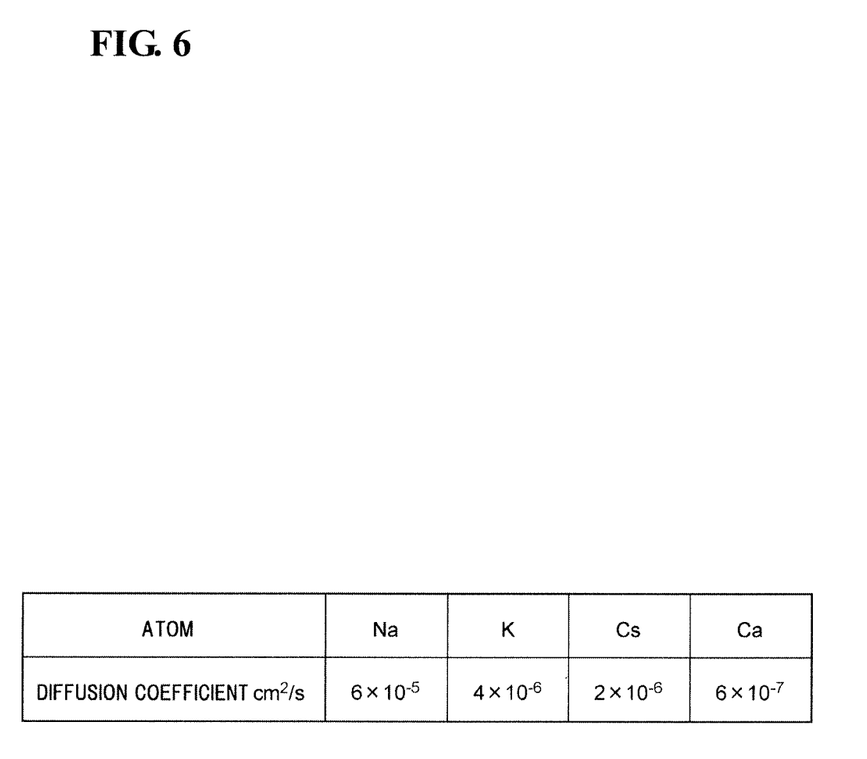
FIG. 6 is a table summarizing the diffusion coefficients of Na, K, Cs, and Ca.

The diffusion coefficient of each element at a concentration of 100 wtppm at the drawing temperature (2,300° C.) was calculated by molecular dynamics calculation. The resulting diffusion coefficients of Na, K, Cs, and Ca are shown in FIG. 6. The results show that the diffusion coefficients of Cs and Ca are ½ or less of the diffusion coefficient of K, and assuming that the K concentration distribution after drawing spreads to twice the core diameter, Cs and Ca are expected to lie within the core diameter.

On the other hand, the diffusion coefficients of impurities which affect the transmission loss of an optical fiber, such as Fe and Ni, are about $1 \times 10^{-12}$ cm$^2$/s.

Compared with this, the diffusion coefficients of Cs and Ca are sufficiently high. In the etching step conducted in order to remove impurities after diffusion and addition, a sufficient difference in diffusion distance is allowed between the second group of dopants and the impurities. It is believed that even if a layer containing the impurities is removed by etching, the second group of dopants can be allowed to remain in the glass.

Figure 7:
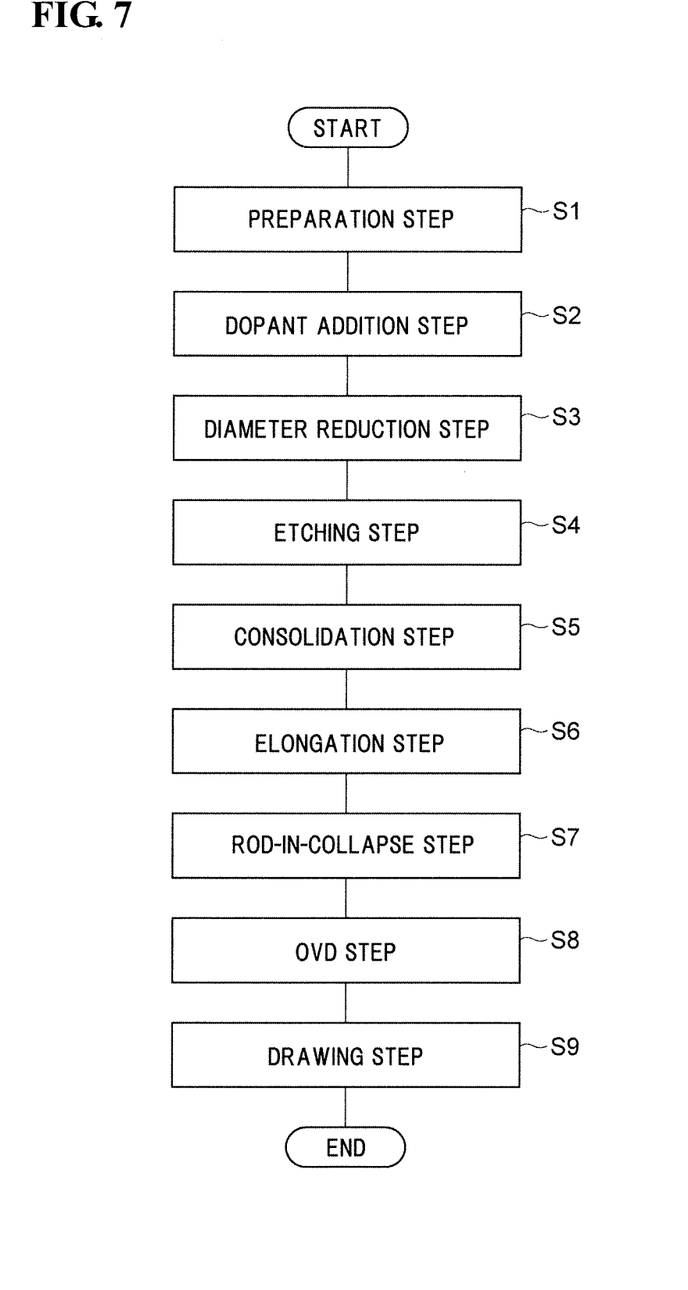
FIG. 7 is a flowchart showing steps for manufacturing an optical fiber according to an embodiment.

FIG. 7 is a flowchart showing steps for manufacturing an optical fiber according to the embodiment. An example of specific conditions will also be described below.

In a preparation step (Step S1), a silica glass-based glass pipe, into which alkali metal elements or the like (dopants) are to be diffused, is prepared. The silica glass-based glass pipe contains 100 to 1,000 wtppm of chlorine (Cl) and 1,000 to 6,000 wtppm of fluorine, in which the concentration of other dopants and impurities is 10 wtppm or less. The silica glass-based glass pipe has an outside diameter of 30 to 40 mm and an inside diameter of about 10 to 20 mm.

In a dopant addition step (Step S2), K and Cs are added as dopants to the inner surface of the silica glass-based glass pipe. As raw materials, 10 g of potassium bromide (KBr) and 15 g of cesium bromide (CsBr) are used. The raw materials are heated to a temperature of 750° C. to 850° C. with an external heat source to generate raw material vapors. While introducing the raw material vapors along with a carrier gas of oxygen at a flow rate of 2 SLM (2 liter/min in the standard state) into the silica glass-based glass pipe, the silica glass-based glass pipe is heated with an oxyhydrogen burner from the outside such that the outer surface of the silica glass-based glass pipe has a temperature of 2,150° C. In this process, heating is performed with the burner traversing at a speed of 30 to 40 mm/min for 15 turns in total so that the element K and the element Cs are diffused and added to the inner surface of the silica glass-based glass pipe.

In a diameter reduction step (Step S3), the diameter of the silica glass-based glass pipe doped with K is reduced. In this process, while allowing oxygen to flow into the inside of the silica glass-based glass pipe at 0.5 SLM, the silica glass-based glass pipe is heated with an external heat source such that the outer surface of the glass-based glass pipe has a temperature of 2,250° C. The diameter reduction is performed by heating with the external heat source traversing for 6 turns in total until the inside diameter of the silica glass pipe is reduced to 5 mm or less.

In an etching step (Step S4), the inner surface of the silica glass-based glass pipe is etched. In this process, vapor phase etching is performed by heating the silica glass pipe with an external heat source while introducing a mixed gas of SF$_6$ (0.2 SLM) and chlorine (0.5 SLM) into the inside of the silica glass pipe. In such a manner, it is possible to etch away the inner surface of the pipe containing impurities, which are added with the intended dopants, at high concentration, and thus, the impurities can be removed.

In a consolidation step (Step S5), the silica glass-based glass pipe is consolidated. In the consolidation step, while introducing a mixed gas of oxygen (0.1 SLM) and He (1 SLM) into the inside of the silica glass pipe 30 and reducing the absolute pressure inside the silica glass pipe to 97 kPa or less, the surface temperature is increased to 2,150° C. to thereby consolidate the silica glass pipe. By the consolidation, a core portion (with an outside diameter of about 20 to 25 mm) is obtained. A core layer which does not contain alkali metal elements or the like may be formed on the outside of the resulting rod by a known method, such as an OVD method or collapse method.

In an elongation and grinding step (Step S6), the core portion is elongated to a diameter of 20 mm, and the outer periphery thereof is removed by grinding so that the diameter becomes 17 mm.

In a rod-in-collapse step (Step S7), a first cladding portion is formed on the outer side of the core portion. The first cladding portion contains 7,000 to 10,000 wtppm of fluorine. In this step, a rod-in-collapse method, in which the core portion is inserted into a silica glass-based glass pipe doped with fluorine and the two are integrated by heating with an external heat source, is used. The relative refractive index difference between the core portion and the first cladding portion is about 0.34% at maximum. As a result of synthesis by the rod-in-collapse method, it is possible to control the moisture content in the core portion and its vicinity, i.e., the first cladding portion to a sufficiently low level.

In a jacket synthesis step (Step S8), the rod formed by integration of the core portion and the first cladding portion is elongated to a predetermined diameter, and then, a second cladding portion containing fluorine is synthesized by an OVD method on the outer side of the rod. Thereby, an optical fiber preform is produced.

In a drawing step (Step S9), an optical fiber can be obtained by drawing the optical fiber preform produced by the optical fiber preform production method described above. The drawing speed is 1,800 to 2,300 m/min, and the drawing tension is 0.5 N. The dopant concentration in the fiber after drawing was measured. As a result, the average concentration of K in the core was 10 wtppm, and the average concentration of Cs in the core was 80 wtppm. The transmission loss of the resulting optical fiber according to the present invention can be reduced to equal to or less than that in the earlier technique, i.e., equal to or less than 0.150 dB/km at a wavelength of 1,550 nm.

The invention claimed is:

1. An optical fiber comprising:
    a core composed of silica glass which contains a first group of dopants consisting of alkali metal elements or alkaline earth metal elements and having a diffusion coefficient of $1\times10^{-12}$ cm$^2$/s or more in silica glass at a temperature of 2,000° C. to 2,300° C. and a second group of dopants consisting of alkali metal elements or alkaline earth metal elements and having a diffusion coefficient that is lower than the diffusion coefficient of the first group of dopants in silica glass; and
    a cladding which surrounds the core, has a refractive index lower than a refractive index of the core, and is composed of silica glass containing fluorine,
    wherein the difference between the maximum value and the minimum value of residual stress in the optical fiber is 150 MPa or less,
    wherein the ratio C2/C1 is 5 or more, where C1 is the average concentration of the first group of dopants in the core, and the C2 is the average concentration of the second group of dopants in the core.

2. The optical fiber according to claim 1, wherein the ratio C2/C1 is 30 or less.

3. The optical fiber according to claim 1, wherein the C1 is 1 to 20 wtppm, and the C2 is 20 to 300 wtppm.

4. The optical fiber according to claim 1, wherein the core contains Na or K as the first group of dopants and contains any one of Rb, Cs, Mg, Ca, and Sr as the second group of dopants.

* * * * *